US009373333B2

(12) United States Patent
Oh et al.

(10) Patent No.: US 9,373,333 B2
(45) **Date of Patent: *Jun. 21, 2016**

(54) METHOD AND APPARATUS FOR PROCESSING AN AUDIO SIGNAL

(71) Applicant: LG ELECTRONICS INC., Seoul (KR)

(72) Inventors: Hyeon O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,067

(22) Filed: Apr. 7, 2014

(65) Prior Publication Data

US 2014/0222440 A1 Aug. 7, 2014

Related U.S. Application Data

(63) Continuation of application No. 12/531,444, filed as application No. PCT/KR2008/001497 on Mar. 17, 2008, now Pat. No. 8,725,279.

(60) Provisional application No. 60/895,314, filed on Mar. 16, 2007.

(30) Foreign Application Priority Data

Mar. 17, 2008 (KR) ........................ 10-2008-0024245
Mar. 17, 2008 (KR) ........................ 10-2008-0024247
Mar. 17, 2008 (KR) ........................ 10-2008-0024248

(51) Int. Cl.
*G06F 17/00* (2006.01)
*G10L 19/008* (2013.01)

(52) U.S. Cl.
CPC .................................... *G10L 19/008* (2013.01)

(58) Field of Classification Search
CPC . G10L 19/008; G10L 19/167; H04S 2400/11; H04S 7/30; H04S 2400/01; H04S 3/008
See application file for complete search history.

(56) References Cited

U.S. PATENT DOCUMENTS 8,155,971 B2 4/2012 Hellmuth et al.
8,280,744 B2 10/2012 Hellmuth et al.

(Continued)

FOREIGN PATENT DOCUMENTS

CN 2807615 Y 8/2006
JP 3-236691 A 10/1991

(Continued)

OTHER PUBLICATIONS

"Call for Proposals on Spatial Audio Object Coding", ITU Study Group 16, Video Coding Experts Group, ISO/IEC JTC1/SC29NVG11, MPEG2007/N8853, Jan. 2007, pp. 1-20, Marrakech, Morocco.

(Continued)

*Primary Examiner* — Joseph Saunders, Jr.

(74) *Attorney, Agent, or Firm* — Birch, Stewart, Kolasch & Birch, LLP

(57) ABSTRACT

A method for decoding an audio signal, receiving a downmix signal having at least one independent object and a background object downmixed therein receiving object information and enhanced object information, wherein the object information includes at least one of level information and correlation information between the independent object and the background object, wherein the enhanced object information includes a residual signal extracting the at least one independent object and the background object from the downmix signal using the object information and the enhanced object information receiving mix information from a user, the mix information being usable to control gain or panning of the independent object or the background object generating downmix processing information using at least one of the object information and enhanced object information processing at least one independent object and the background object using at least one of the downmix processing information and the mix information.

8 Claims, 11 Drawing Sheets

(56) References Cited

U.S. PATENT DOCUMENTS

| | | | |
|---|---|---|---|
| 2004/0096065 | A1 | 5/2004 | Vaudrey et al. |
| 2007/0101249 | A1 | 5/2007 | Lee et al. |
| 2007/0255572 | A1 | 11/2007 | Miyasaka et al. |
| 2009/0125313 | A1 | 5/2009 | Hellmuth et al. |
| 2009/0125314 | A1 | 5/2009 | Hellmuth et al. |
| 2011/0022402 | A1 | 1/2011 | Engdegard et al. |

FOREIGN PATENT DOCUMENTS

| | | | |
|---|---|---|---|
| JP | 6-54400 | A | 2/1994 |
| JP | 2001-100792 | A | 4/2001 |
| JP | 2001-268697 | A | 9/2001 |
| JP | 2002-44793 | A | 2/2002 |
| JP | 2006-100869 | A | 4/2006 |
| JP | 2008-522244 | A | 6/2008 |
| JP | 2009-501354 | A | 1/2009 |
| WO | 2005-523480 | A | 8/2005 |
| WO | WO 2005/101370 | A1 | 10/2005 |
| WO | WO 2005/101371 | A1 | 10/2005 |
| WO | WO 2006/005390 | A1 | 1/2006 |
| WO | WO 2006/022124 | A1 | 3/2006 |
| WO | WO 2006/060279 | A1 | 6/2006 |
| WO | WO 2006/084916 | A2 | 8/2006 |
| WO | WO 2006/089570 | A1 | 8/2006 |
| WO | WO 2007/004828 | A2 | 1/2007 |
| WO | WO 2007/004830 | A1 | 1/2007 |
| WO | WO 2007/007263 | A2 | 1/2007 |
| WO | WO 2007/010785 | A1 | 1/2007 |

OTHER PUBLICATIONS

"Concepts of Object-Oriented Spatial Audio Coding," MPEG Meeting; Jul. 7-21, 2006; Klagenfurt, Austria; (Motion Picture Expert Group or ISO/IEC JTC1/SC29/WG11); No. N8329, XP030014821.

"WD on ISO/IEC 23003-2:200x, SOAC text and reference software," MPEG Meeting; Jan. 14-18, 2008; Antalya, Turkey; (Motion Picture Expert Group or ISO/IEC JTC1/SC29/WG11), No. N9637, XP030016131, ISSN: 0000-0043.

Faller, "Parametric Joint-Coding of Audio Sources", AES 120th Convention, vol. 2, May 20, 2006, pp. 1-12.

Koppens et al., "Multi-Channel Goes Mobile: MPEG Surround Binaural Rendering", AES 29th International Conference Paper, Seoul Korea, Sep. 2-4, 2006.

Kyungryeol Koo et al., "Variable Subband Analysis for High Quality Spatial Audio Object Coding," Advanced Communication Technology (2008), ICACT 2008, pp. 1205-1208, XP031245331, ISBN: 978-89/5519-136-3.

Myburg et al., "The Reference Model Architecture for MPEG Spatial Audio Coding", Convention Paper 6447, 118th Convention Audio Engineering Society, Barcelona, Spain, May 28-31, 2005.

Oliver Hellmuth et al., "Information and Verification Results for CE on Karaoke/Solo system improving the performance of MPEG SAOC RM0," MPEG Meeting; Jan. 14-18, 2008; Antalya, Turkey; (Motion Picture Expert Group or ISO/IEC JTC1/SC29/WG11); No. M15123, XP 030043720.

Oliver Hellmuth et al., "Proposed Improvement for MPEG SAOC," MPEG Meeting; Oct. 22-26, 2007; Shenzen, China; (Motion Picture Expert Group or ISO/IEC JTC1/SC29/WG11), No. M14985, XP030043591.

Oomen et al., "MPEG Spatial Audio Coding/MPEG Surround: overview and Current Status", Convention Paper, 119th Convention Audio Engineering Society, New York, USA, Oct. 7-10, 2005.

Coding Technologies et al., "Proposed SAOc working draft document", International Organization for Standardization, Coding of Moving Pictures and Audio, ISO/IEC JTC 1/SC 29/WG 11, M14989, Oct. 2007, Shenzhen, China, 81 pages, XP030043595.

Seo et al., "CE on Efficient Decoding of a Controllable Object and an MBO", International Organization for Standardization, Coding Moving Pictures and Audio, ISO/IEC JTC 1/SC 29/WG 11, MPEG2008/M15143, Jan. 2008, Antalya, Turkey, 7 pages., XP030043595.

METHOD AND APPARATUS FOR PROCESSING AN AUDIO SIGNAL

CROSS-REFERENCE TO RELATED APPLICATIONS

This application is a Continuation of co-pending application Ser. No. 12/531,444 filed on Nov. 25, 2009, which is the National Phase of PCT/KR2008/001497 filed on Mar. 17, 2008, which claims priority under 35 U.S.C. 119(e) to U.S. Provisional Application No. 60/895,314 filed on Mar. 16, 2007 and Korean Patent Application Nos. 10-2008-0024245 filed on Mar. 17, 2008, 10-2008-0024247 filed on Mar. 17, 2008 and 10-2008-0024248 filed on Mar. 17, 2008, the entire contents of all of the above applications are hereby incorporated by reference.

BACKGROUND OF THE INVENTION

1. Field of the Invention

The present invention relates to a method and an apparatus for processing an audio signal, and more particularly, to a method and an apparatus for processing an audio signal that can process an audio signal received by a digital medium, a broadcast signal, and so on.

2. Discussion of the Related Art

Generally, in a process of downmixing a plurality of objects into a mono or stereo signal, parameters are extracted from each object signal. Such parameters may be used in a decoder, and panning and gain of each object may be controlled by a user's choice (or selection).

SUMMARY OF THE INVENTION

In order to control each object signal, each source included in a downmix should be appropriately positioned and panned.

Furthermore, in order to ensure downward compatibility using a channel-oriented decoding method, an object information should be flexibly converted to a multi-channel parameter for upmixing.

An object of the present invention devised to solve the problem lies on providing a method and an apparatus for processing an audio signal that can control the gain and panning of an object without limitation.

Another object of the present invention devised to solve the problem lies on providing a method and an apparatus for processing an audio signal that can control the gain and panning of an object-based upon a user's choice (or selection).

A further object of the present invention devised to solve the problem lies on providing a method and an apparatus for processing an audio signal that does not generate distortion in sound quality, even when the gain of a vocal sound (or music) or background music has been adjusted within a large range.

The present invention has the following effects and advantages.

Firstly, the gain and panning of an object may be controlled.

Secondly, the gain and panning of an object may be controlled based upon a user's choice (or selection).

Thirdly, even when either one of a vocal sound (or music) and a background music is completely suppressed, a distortion in sound quality caused by gain adjustment may be prevented.

And, finally, when at least two independent objects, such as a vocal sound, exist (i.e., when a stereo channel or a plurality of voice signals exists), a distortion in sound quality caused by gain adjustment may be prevented.

DETAILED DESCRIPTION OF THE INVENTION

Figure 1:
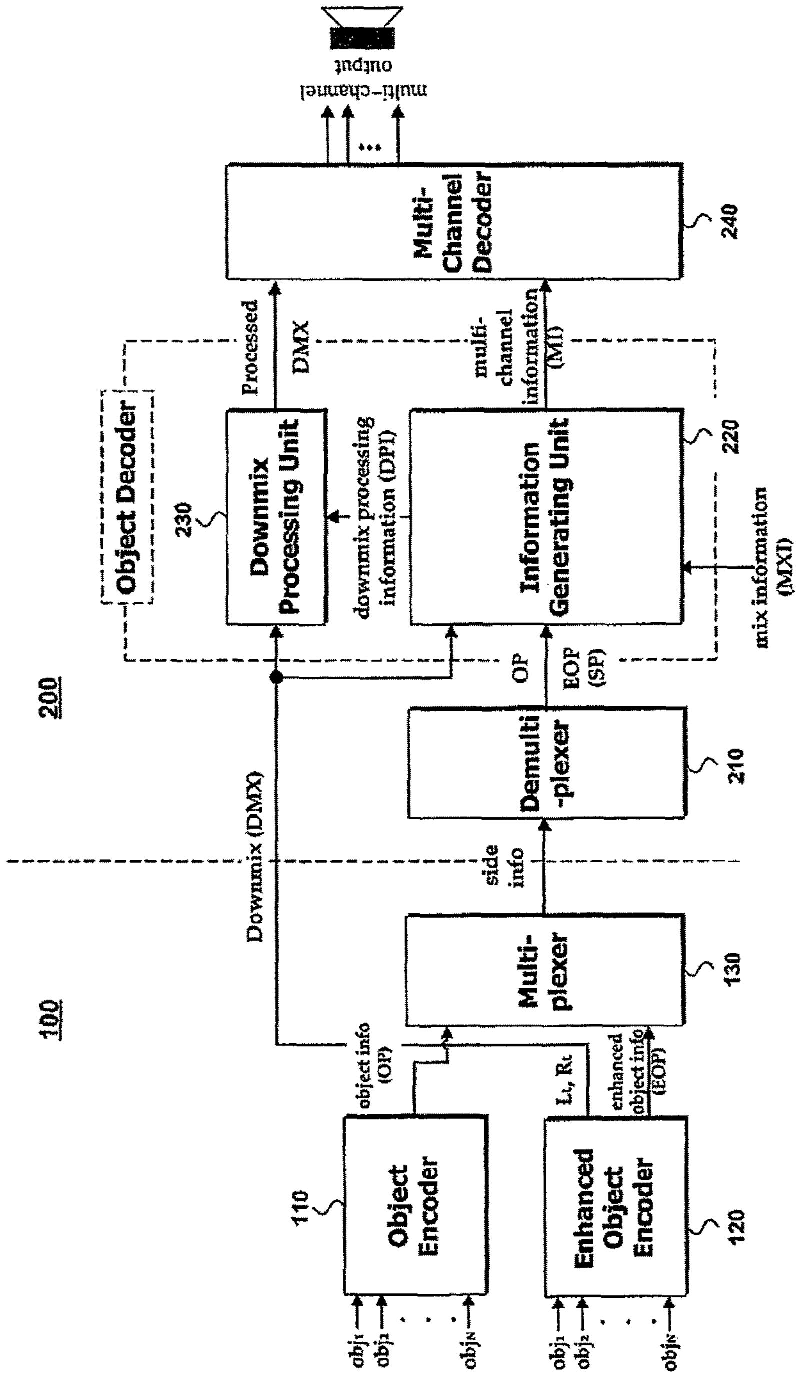
FIG. 1 illustrates a block view showing a structure of an apparatus for processing an audio signal according to an embodiment of the present invention.

The object of the present invention can be achieved by providing a method for processing an audio signal including receiving a downmix information having at least two independent objects and a background object downmixed therein; separating the downmix information into a first independent object and a temporary background object using a first enhanced object information; and extracting a second independent object from the temporary background object using a second enhanced object information.

According to the present invention, the independent object may correspond to an object-based signal, and the background object may correspond to a signal either including at least one channel-based signal or having at least one channel-based signal downmixed therein.

According to the present invention, the background object may include a left channel signal and a right channel signal.

According to the present invention, the first enhanced object information and the second enhanced object information may correspond to residual signals.

According to the present invention, the first enhanced object information and the second enhanced object information may be included in a side information bitstream, and a number of enhanced objects included in the side information bitstream and a number of independent objects included in the downmix information may be equal to one another.

According to the present invention, the separating the downmix information may be performed by a module generating (N+1) number of outputs using N number of inputs.

According to the present invention, the method may further include receiving an object information and a mix information; and generating a multi-channel information for adjusting gains of the first independent object and the second independent object using the object information and the mix information.

According to the present invention, the mix information may be generated based upon at least one of an object position information, an object gain information, and a playback configuration information.

According to the present invention, the extracting a second independent object may correspond to extracting a second temporary background object and a second independent object, and may further include extracting a third independent object from the second temporary background object using a second enhanced object information.

According to the present invention, another object of the present invention can be achieved by providing a recording medium capable of reading using a computer having a program stored therein, the program executing receiving a downmix information having at least two independent objects and a background object downmixed therein; separating the downmix information into a first independent object and a temporary background object using a first enhanced object information; and extracting a second independent object from the temporary background object using a second enhanced object information.

Another object of the present invention can be achieved by providing an apparatus for processing an audio signal including an information receiving unit receiving a downmix information having at least two independent objects and a background object downmixed therein; a first enhanced object information decoding unit separating the downmix into a first independent object and a temporary background object using a first enhanced object information; and a second enhanced object information decoding unit extracting a second independent object from the temporary background object using a second enhanced object information.

Another object of the present invention can be achieved by providing a method for processing an audio signal including generating a temporary background object and a first enhanced object information using a first independent object and a background object; generating a second enhanced object information using a second independent object and a temporary background object; and transmitting the first enhanced object information and the second enhanced object information.

Another object of the present invention can be achieved by providing an apparatus for processing an audio signal including a first enhanced object information generating unit generating a temporary background object and a first enhanced object information using a first independent object and a background object; a second enhanced object information generating unit generating a second enhanced object information using a second independent object and a temporary background object; and a multiplexer transmitting the first enhanced object information and the second enhanced object information.

Another object of the present invention can be achieved by providing a method for processing an audio signal including receiving a downmix information having an independent object and a background object downmixed therein; generating a first multi-channel information for controlling the independent object; and generating a second multi-channel information for controlling the background object using the downmix information and the first multi-channel information.

According to the present invention, the generating a second multi-channel information may include subtracting a signal having the first multi-channel information applied therein from the downmix information.

According to the present invention, the subtracting a signal from the downmix information may be performed within one of a time domain and a frequency domain.

According to the present invention, the subtracting a signal from the downmix information may be performed with respect to each channel, when a number of channel of the downmix information and a number of channels of the signal having the first multi-channel information applied therein is equal to one another.

According to the present invention, the method may further include generating an output channel from the downmix information using the first multi-channel information and the second multi-channel information.

According to the present invention, the method may further include receiving an enhanced object information; and separating the independent object and the background object from the downmix information using the enhanced object information.

According to the present invention, the method may further include receiving a mix information, and the generating a first multi-channel information and the generating a second multi-channel information may be performed based upon the mix information.

According to the present invention, the mix information may be generated based upon at least one of an object position information, an object gain information, and a playback configuration information.

According to the present invention, the downmix information may be received via a broadcast signal.

According to the present invention, the downmix information may be received on a digital medium.

According to the present invention, another object of the present invention can be achieved by providing a recording medium capable of reading using a computer having a program stored therein, the program executing receiving a downmix information having an independent object and a background object downmixed therein; generating a first multi-channel information for controlling the independent object; and generating a second multi-channel information for controlling the background object using the downmix information and the first multi-channel information.

Another object of the present invention can be achieved by providing an apparatus for processing an audio signal including an information receiving unit receiving a downmix information having an independent object and a background object downmixed therein; and a multi-channel generating unit generating a first multi-channel information for controlling the independent object, and generating a second multi-channel information for controlling the background object using the downmix information and the first multi-channel information.

Another object of the present invention can be achieved by providing a method for processing an audio signal including receiving a downmix information having at least one independent object and a background object downmixed therein; receiving an object information and a mix information; and extracting at least one independent object from the downmix information using the object information and the enhanced object information.

According to the present invention, the object information may correspond to information associated with the independent object and the background object.

According to the present invention, the object information may include at least one of a level information and a correlation information between the independent object and the background object.

According to the present invention, the enhanced object information may include a residual signal.

According to the present invention, the residual signal may be extracted during a process of grouping at least one object-based signal into an enhanced object.

According to the present invention, the independent object may correspond to an object-based signal, and the background object may correspond to a signal either including at least one channel-based signal or having at least one channel-based signal downmixed therein.

According to the present invention, the background object may include a left channel signal and a right channel signal.

According to the present invention, the downmix information may be received via a broadcast signal.

According to the present invention, the downmix information may be received on a digital medium.

According to the present invention, another object of the present invention can be achieved by providing a recording medium capable of reading using a computer having a program stored therein, the program executing receiving a downmix information having at least one independent object and a background object downmixed therein; receiving an object information and a mix information; and extracting at least one independent object from the downmix information using the object information and the enhanced object information.

A further object of the present invention can be achieved by providing an apparatus for processing an audio signal including an information receiving unit receiving a downmix information having at least one independent object and a background object downmixed therein and receiving an object information and a mix information; and an information generating unit extracting at least one independent object from the downmix using the object information and the enhanced object information.

Reference will now be made in detail to the preferred embodiments of the present invention, examples of which are illustrated in the accompanying drawings. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within. Also, the embodiments described in the description of the present invention and the structures illustrated in the drawings are merely exemplary of the most preferred embodiment of this invention. And, since the preferred embodiment in unable to wholly represent the technical spirit and scope of the present invention, it is intended that the present invention covers the modifications and variations of this invention provided they come within the scope of the appended claims and their equivalents.

Most particularly, in the description of the present invention, information collectively refers to the terms values, parameters, coefficients, elements, and so on. And, in some cases the definition of the terms may be interpreted differently. However, the present invention will not be limited such definitions.

Especially, the term object is a concept including both an object-based signal and a channel-based signal. However, in some cases, the term object may only indicate the object-based signal.

FIG. 1 illustrates a block view showing a structure of an apparatus for processing an audio signal according to an embodiment of the present invention. Referring to FIG. 1, the apparatus for processing an audio signal according to the embodiment of the present invention includes an encoder 100 and a decoder 200. Herein, the encoder 100 includes an object encoder 110, an enhanced object encoder 120, and a multiplexer 130. And, the decoder 200 includes a demultiplexer 210, an information generating unit 220, a downmix processing unit 230, and a multi-channel decoder 240. Herein, after briefly describing each of the parts included in the apparatus for processing an audio signal according to the embodiment of the present invention, the enhanced object encoder 120 of the encoder 100 and the information generating unit 220 of the decoder 220 will be described in detail in a later process with reference to FIG. 2 to FIG. 11.

First of all, the object encoder 110 uses at least one object ($obj_N$) in order to generate an object information (OP). Herein, the object information (OP) corresponds to information related to object-based signals and may include object level information, object correlation information, and so on. Meanwhile, the object encoder 110 groups at least one object so as to generate a downmix. This process may be identical to a process of generating an enhanced object by having an enhanced object generating unit 122 group at least one object, which is to be described with reference to FIG. 2. However, the present invention will not be limited only to this example.

The enhanced object encoder 120 uses at least one object ($obj_N$) in order to generate an enhanced object information (OP) and a downmix (DMX) ($L_L$ and $R_L$). More specifically, at least one object-based signal is grouped so as to generate an enhanced object (EO), and a channel-based signal and an enhanced object (EO) are used in order to generate an enhanced object information (EOP). First of all, an enhanced object information (EOP) may correspond to energy information (including level information), residual signal, and so on, which will be described in detail later on with reference to FIG. 2. Meanwhile, the channel-based signal mentioned herein corresponds to a background signal that cannot be controlled by each object and will henceforth be referred to as a background object. And, since the enhanced object can be controlled independently by each object, the enhanced object may be referred to as an independent object.

The multiplexer 130 multiplexes the object information (OP) generated by the object encoder 110 and the enhanced object information (EOP) generated by the enhanced object encoder 120, thereby generating a side information bitstream. Meanwhile, the side information bitstream may include spatial information (or spatial parameter) (SP) (not shown) corresponding to the channel-based signal. Herein, spatial information corresponds to information required for decoding channel-based signals, and spatial information may include channel level information, channel correlation information, and so on. However, the present invention will not be limited to this example.

The demultiplexer 210 of the decoder extracts an object information (OP) and an enhanced object information (EOP) from the side information bitstream. And, when the spatial information (SP) is included in the side information bitstream, the demultiplexer 210 extracts more spatial information (SP).

The information generating unit 220 uses the object information (OP) and enhanced object information (EOP) in order to generate multi-channel information (MI) and downmix processing information (DPI). In generating the multi-channel information (MI) and downmix processing information (DPI), downmix information (DMX) may be used, which will be described in detail later on with reference to FIG. 8.

The downmix processing unit 230 uses the downmix processing information (DPI) in order to process the downmix (DMX). For example, the downmix (DMX) may be processed in order to adjust the gain or panning of the object.

The multi-channel decoder 240 receives the processed downmix and uses the multi-channel information (MI) to upmix a processed downmix signal, thereby generating a multi-channel signal.

Hereinafter, detailed structures of the enhanced object encoder 120 of the encoder 100 according to a variety of embodiments will be described with reference to FIG. 2 to FIG. 6. Also, various embodiments of the side information bitstream will be described in detail with reference to FIG. 8. And, finally, a detailed structure of the information generating unit 220 of the decoder 200 will be described in detail with reference to FIG. 9 and FIG. 11.

Figure 2:
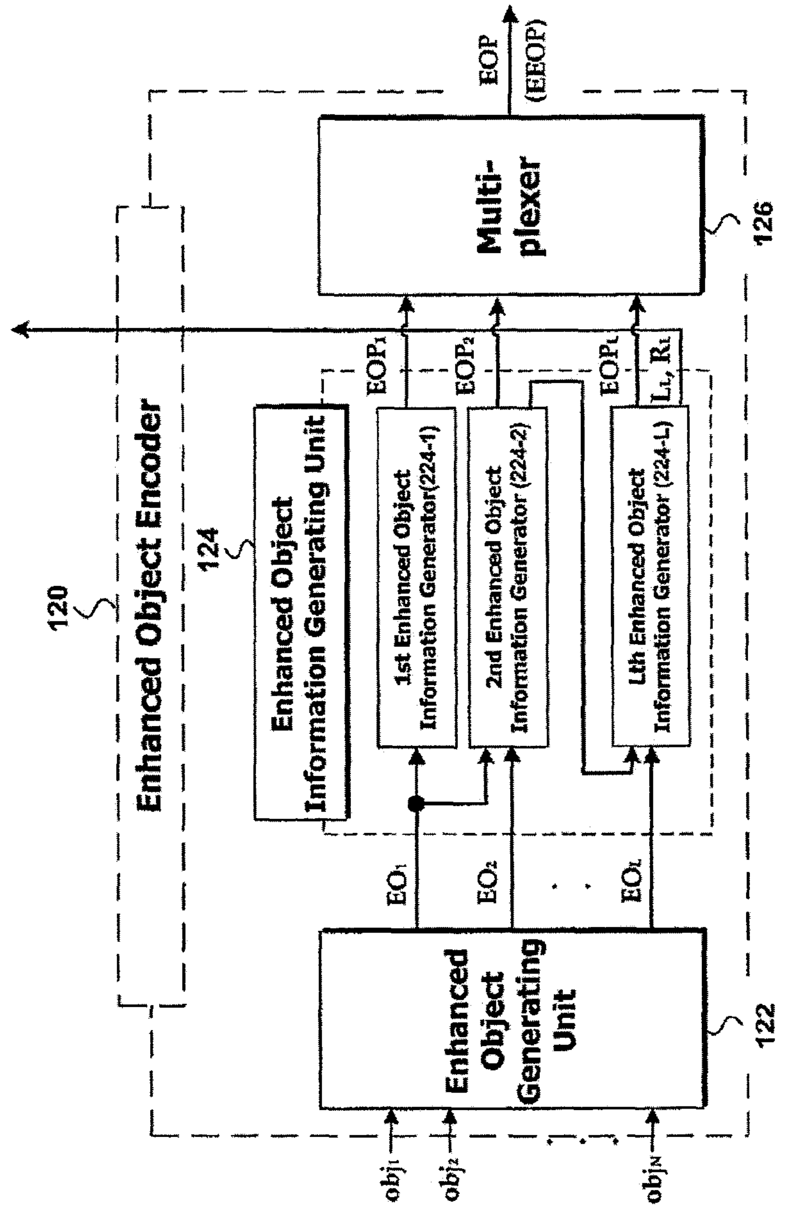
FIG. 2 illustrates a detailed block view showing a structure of an enhanced object encoder included in the apparatus for processing an audio signal according to the embodiment of the present invention.

FIG. 2 illustrates a detailed block view showing a structure of an enhanced object encoder included in the apparatus for processing an audio signal according to the embodiment of the present invention. Referring to FIG. 2, the enhanced object encoder 120 includes an enhanced object generating unit 122, an enhanced object information generating unit 124, and a multiplexer 126.

The enhanced object generating unit 122 groups at least one object ($obj_N$) in order to generate at least one enhanced object ($EO_L$). Herein, the enhanced object ($EO_L$) is grouped in order to provide high quality control. For example, the enhanced object ($EO_L$) may be grouped in order to enable the enhanced object ($EO_L$) over the background object to be completely suppressed independently (or vice versa, wherein only the enhanced object ($EO_L$) is reproduced (or played-back), and wherein the background object is completely suppressed). Herein, the object ($obj_N$) that is to be the subject for grouping may be an object-based signal instead of a channel-based signal. And, the enhanced object (EO) may be generated by using a variety of methods, which are as follows: 1) one object may be used as one enhanced object (i.e., $EO_1=obj_1$), 2) at least two objects may be added so as to configure an enhanced object (i.e., $EO_2=obj_1+obj_2$). Also, 3) a signal having a particular object excluded from the downmix may be used as the enhanced object (i.e., $EO_3=D-obj_2$), and a signal having at least two objects excluded from the downmix may be used as the enhanced object (i.e., $EO_4=D-obj_1-obj_2$). The concept of the downmix (D) mentioned in methods 3) and 4) is different from that of the above-described downmix (DMX) ($L_L$ and $R_L$), and may be referred to as a signal having only a downmixed object-based signal. Accordingly, the enhanced object (EO) may be generated by using at least one of the 4 methods described above.

The enhanced object information generating unit 124 uses the enhanced object (EO) so as to generate an enhanced object information (EOP). Herein, an enhanced object information (EOP) refers to an information on an enhanced object that may correspond to a) energy information (including level information) of an enhanced object, b) a relation between an enhanced object (EO) and a downmix (D) (e.g., mixing gain), c) enhanced object level information or enhanced object correlation information according to a high time resolution or high frequency resolution, d) prediction information or envelope information in a time domain with respect to an enhanced object (EO), and e) a bitstream having information of a time domain or spectrum domain with respect to an enhanced object such as a residual signal.

Meanwhile, if the enhanced object (EO) is generated as shown in the first and third examples (i.e., $EO_1=obj_1$ and $EO_3=D-obj_2$), in the above-described examples, the enhanced object information (EOP) may generate enhanced object information ($EOP_1$ and $EOP_3$) for each of the enhanced objects ($EO_1$ and $EO_3$) of the first and third examples, respectively. At this point, the enhanced object information ($EOP_1$) according to the first example may correspond to information (or parameter) required for controlling the enhanced object ($EO_1$) according to the first example. And, the enhanced object information ($EOP_3$) according to the third example may be used to express (or represent) an instance in which only a particular object ($obj_2$) is suppressed.

The enhanced object information generating unit 124 may include one or more enhanced object information generators 124-1, . . . , 124-L. More specifically, the enhanced object information generating unit 124 may include a first enhanced object information generator 124-1 generating an enhanced object information ($EOP_1$) corresponding to one enhanced object ($EO_1$), and may also include a second enhanced object information generator 124-2 generating an enhanced object information ($EOP_2$) corresponding to at least two enhanced objects ($EO_1$ and $EO_2$). Meanwhile, $L^{th}$ enhanced object information generator 124-L generating an enhanced object information ($EOP_L$) using not only the enhanced object ($EO_1$) but also the output of the second enhanced object information generator 124-2 may be included. Each of the enhanced object information generators 124-1, . . . , 124-L may be operated by a module generating N number of outputs by using (N+1) number of inputs. For example, each of the enhanced object information generators 124-1, . . . , 124-L may be operated by a module generating 2 outputs by using 3 inputs. Hereinafter, a variety of embodiments of the enhanced object information generators 124-1, . . . , 124-L will be described in detail with reference to FIG. 3 to FIG. 7. Meanwhile, the enhanced object information generating unit 124 may further generate an enhanced enhanced object (EEOP), which will be described later on with reference to FIG. 7.

The multiplexer 126 multiplexes at least one enhanced object information ($EOP_1$, . . . , $EOP_L$) (and enhanced enhanced object (EEOP)) generated from the enhanced object information generating unit 124.

Figure 3:
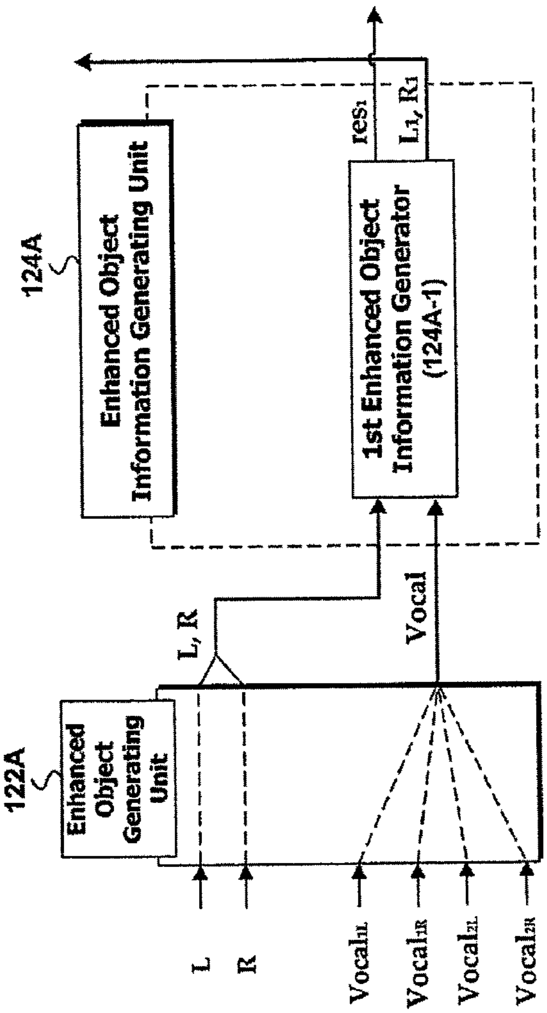
FIG. 3 illustrates a first example of an enhanced object generating unit and an object information generating unit.
Figure 4:
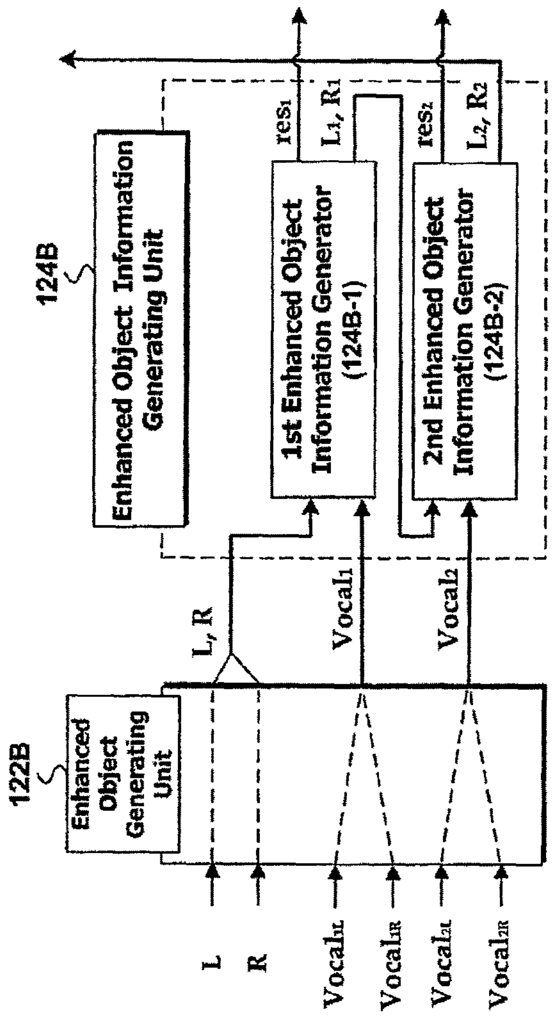
FIG. 4 illustrates a second example of an enhanced object generating unit and an object information generating unit.
Figure 5:
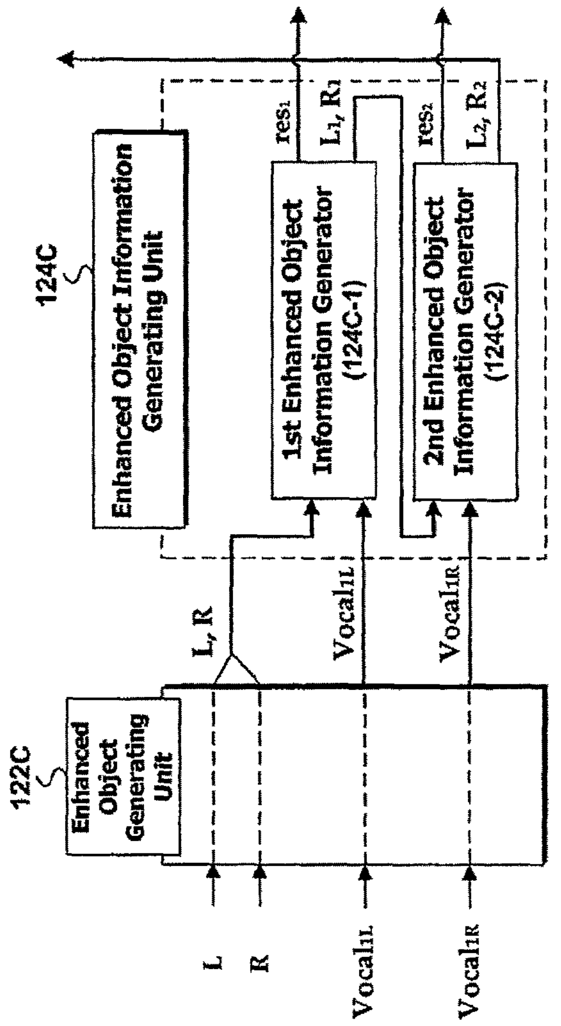
FIG. 5 illustrates a third example of an enhanced object generating unit and an object information generating unit.
Figure 6:
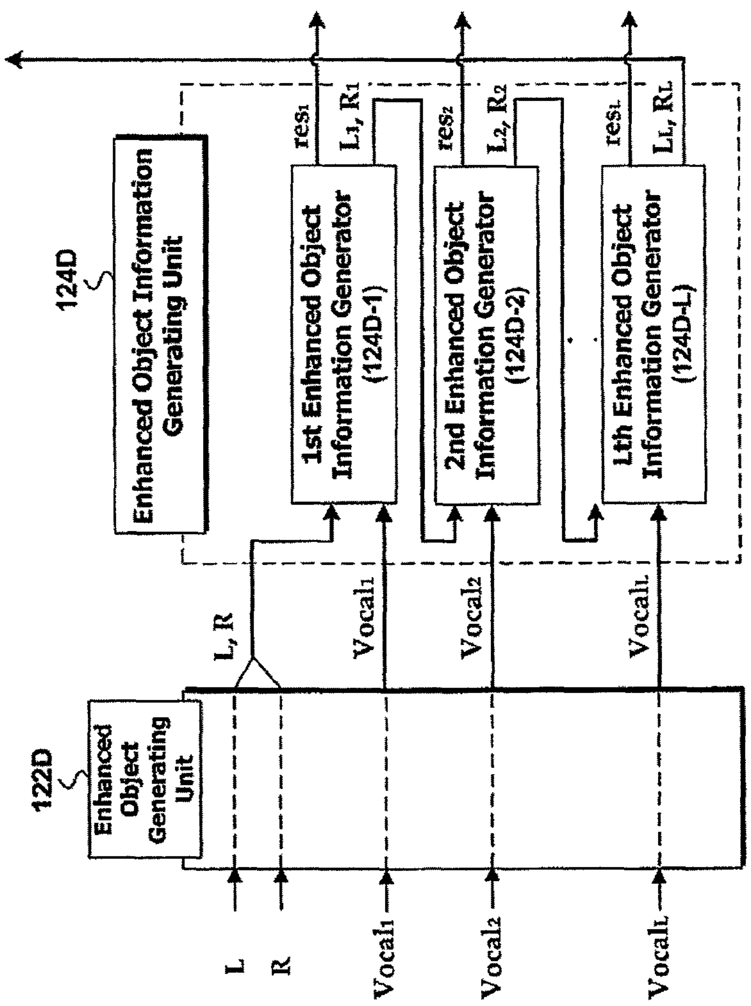
FIG. 6 illustrates a fourth example of an enhanced object generating unit and an object information generating unit.
Figure 7:
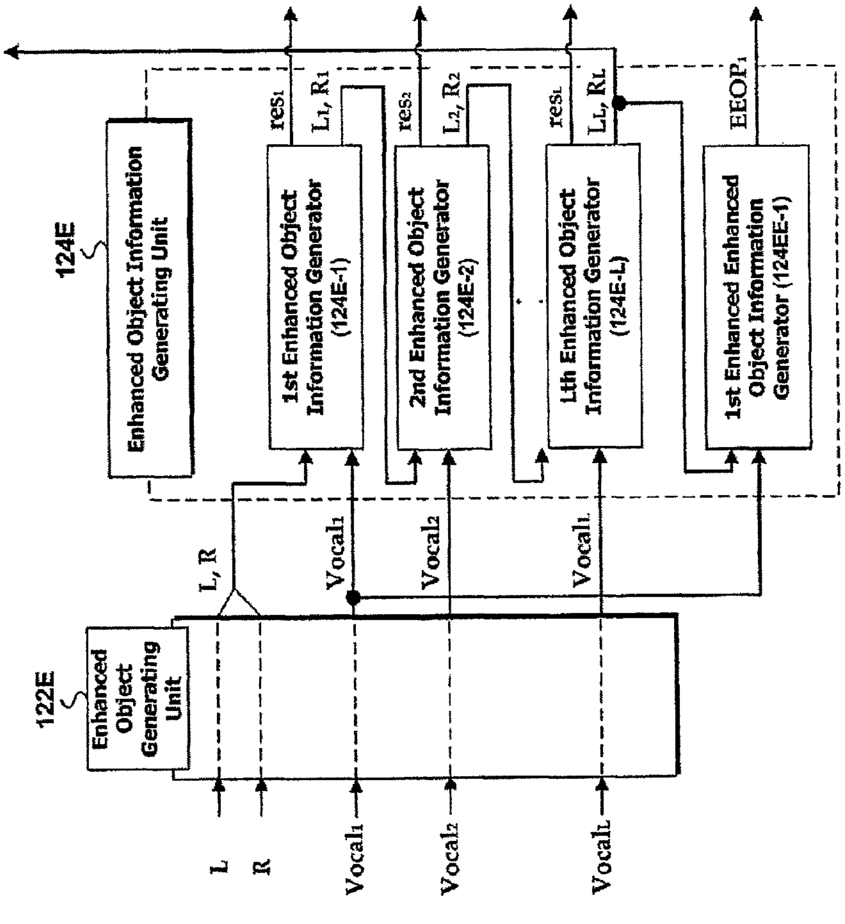
FIG. 7 illustrates a fifth example of an enhanced object generating unit and an object information generating unit.

FIG. 3 and FIG. 7 respectively illustrate first to fifth examples of the enhanced object generating unit and the enhanced object information generating unit. FIG. 3 illustrates an example wherein the enhanced object information generating unit includes a first enhanced object information generator. FIG. 4 to FIG. 6 respectively illustrate examples wherein at least two enhanced parameter generators (first enhanced object information generator to $L^{th}$ enhanced object information generator) are included in series. Meanwhile, FIG. 7 illustrates an example wherein a first enhanced enhanced object information generator generating an enhanced enhanced object information (EEOP) is included.

First of all, referring to FIG. 3, the enhanced object generating unit 122A receives each of a left channel signal (L) and a right channel signal (R), as channel-based signals, and also receives stereo vocal signals ($Vocal_{1L}$, $Vocal_{1R}$, $Vocal_{2L}$, $Vocal_{2R}$), as object-based signals, so as to generate a single enhanced object (Vocal). Firstly, the channel-based signals (L and R) may correspond to a signal having a multi-channel signal (e.g., L, R, $L_S$, $R_S$, C, LFE) downmixed therein. As described above, the spatial information extracted during this process may include a side information bitstream.

Meanwhile, the stereo vocal signals ($Vocal_{1L}$, $Vocal_{1R}$, $Vocal_{2L}$, $Vocal_{2R}$) corresponding to object-based signals may include a left channel signal ($Vocal_{1L}$) and a right channel signal ($Vocal_{1R}$) corresponding to a vocal sound ($Vocal_1$) of singer 1, and a left channel signal ($Vocal_{2L}$) and a right channel signal ($Vocal_{2R}$) corresponding to a vocal sound ($Vocal_2$) of singer 2. Meanwhile, although in this example it is illustrated in the stereo object signal, it is apparent that a multi-channel object signal ($Vocal_{1L}$, $Vocal_{1R}$, $Vocal_{1Ls}$, $Vocal_{1Rs}$, $Vocal_{1C}$, $Vocal_{1LFE}$) may be received and be grouped as a single enhanced object (Vocal).

As described above, since a single enhanced object (Vocal) is generated, the enhanced object information generating unit 124A includes only a first enhanced object information generator 124A-1 corresponding to the single enhanced object (Vocal). The first enhanced object information generator 124A-1 uses the enhanced object (Vocal) and channel-based signal (L and R) so as to generate a first residual signal ($res_1$) as an enhanced object information (EON and a temporary background object ($L_1$ and $R_1$). The temporary background object ($L_1$ and $R_1$) corresponds to a signal having a channel-based signal, i.e., a background object (L and R) added to the enhanced object (Vocal). Therefore, in the third example, wherein only a single enhanced object information generator exists, the temporary background object ($L_1$ and $R_1$) may correspond to a final downmix signal ($L_1$ and $R_1$).

Referring to FIG. 4, as shown in the first example of FIG. 3, the stereo vocal signals ($Vocal_{1L}$, $Vocal_{1R}$, $Vocal_{2L}$, $Vocal_{2R}$) are received. However, the difference in the second example of FIG. 4 is that the stereo vocal signals are grouped into two enhanced objects ($Vocal_1$ and $Vocal_2$), instead of being grouped into a single enhanced object. Since two enhanced objects exist, as described above, the enhanced object generating unit 124B includes a first enhanced object generator 124B-1 and a second enhanced object generator 124B-2.

The first enhanced object generator 124B-1 uses a background signal (channel-based signal (L and R)) and a first enhanced object signal ($Vocal_1$) so as to generate a first enhanced object information ($res_1$) and a temporary background object ($L_1$ and $R_1$).

The second enhanced object generator 124B-2 not only uses a second enhanced object signal ($Vocal_2$) but also uses a first temporary background object ($L_1$ and $R_1$), so as to generate a second enhanced object information ($res_1$) and a background object ($L_2$ and $R_2$) as the final downmix ($L_1$ and $R_1$). In the second example shown in FIG. 4, the number of enhanced objects (EO) and the number of enhanced objects (EOP: res) are each equal to '2'.

Referring to FIG. 5, as shown in the second example of FIG. 4, the enhanced object information generating unit 124C includes a first enhanced object information generator 124C-1 and a second enhanced object generator 124C-2. However, the only difference in this example is that the enhanced object ($Vocal_{1L}$, and $Vocal_{1R}$) is configured of a single object-based signal ($Vocal_{1L}$, and $Vocal_{1R}$) instead of being configured of two object-based signals. In the third example, the number (L) of enhanced objects (EO) and the number (L) of the enhanced object information (EOP) are equal to one another.

Referring to FIG. 6, the structure is very similar to the second example shown in FIG. 4. However, the difference in this example is that a total of L number of enhanced objects ($Vocal_1$, . . . , $Vocal_L$) are generated in the enhanced object generating unit 122. Another difference in this example is that in addition to a first enhanced object information generator 124D-1 and a second enhanced object information 124D-2, up to an $L^{th}$ enhanced object information generator 124D-L are included in the enhanced object generating unit 124D. The $L^{th}$ enhanced object information generator 124D-L uses a second background object ($L_2$ and $R_2$), which is generated by the second enhanced object information generator 124D-2, and an $L^{th}$ enhanced object ($Vocal_1$) so as to generate an $L^{th}$ enhanced object information ($EOP_L$ and $res_L$) and downmix information ($L_L$ and $R_L$) (DMX).

Referring to FIG. 7, the enhanced object information generating unit of the fourth example shown in FIG. 6 further includes a first enhanced enhanced object information generator 124EE-1. A signal (DDMX) having an enhanced object ($EO_L$) removed (or subtracted) from the downmix (DMX: $L_L$ and $R_L$) may be defined as shown below.

$$DDMX=DMX-EO_L \qquad \text{[Equation 1]}$$

The enhanced enhanced object information (EEOP) does not correspond to information between the downmix (DMX: $L_L$ and $R_L$) and the enhanced object ($EO_L$) but corresponds to information between the signal (DDMX) defined in Equation 1 and the enhanced object ($EO_L$). When the enhanced object ($EO_L$) is subtracted from the downmix (DMX), a quantizing noise may be generated with respect to the enhanced object. Such quantizing noise may be cancelled by using an object information (OP), thereby enhancing the sound quality. (This process will be described in detail later on with reference to FIG. 9 to FIG. 11). In this case, the quantizing noise is controlled with respect to the downmix (DMX) including the enhanced object (EO). Substantially, however, the quantizing noise, which exists within the downmix having the enhanced object (EO) removed therefrom, is controlled. Therefore, in order to eliminate (or remove) the quantizing noise with more accuracy, information for eliminating the quantizing noise with respect to the downmix having the enhanced object (EO) removed therefrom is required. Herein, the enhanced enhanced parameter (EEOP) defined above may be used. At this point, the enhanced enhanced parameter may be generated by using the same method as that for generating an object information (OP).

By being provided with the above-described parts, the encoder 100 of the apparatus for processing an audio signal according to the embodiment of the present invention generates a downmix and a side information bitstream.

Figure 8:
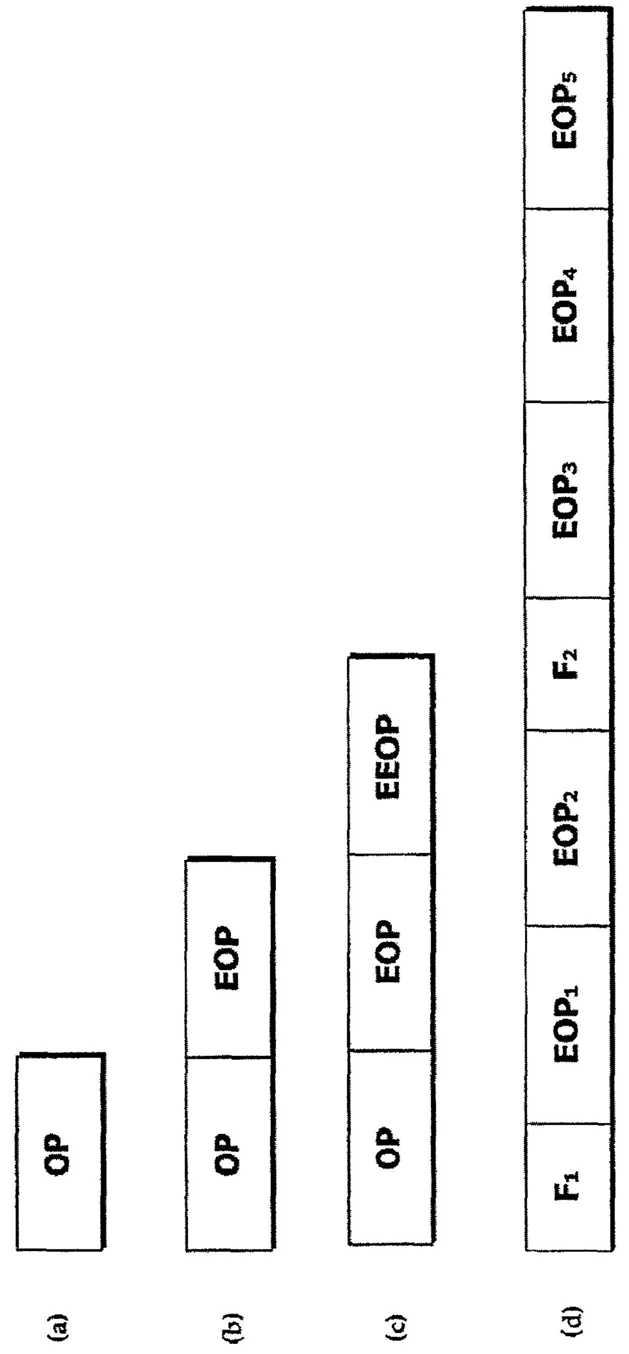
FIG. 8 illustrates diverse examples of a side information bitstream.

FIG. 8 illustrates diverse examples of a side information bitstream. Referring to FIG. 8, and more particularly, referring to (a) and (b) of FIG. 8, the side information bitstream may only include an object information (OP) generated by the object encoder 110, as shown in (a) of FIG. 8, and the side information bitstream may also include not only an object information (OP) but also an enhanced object information (EOP) generated by the enhanced object encoder 120, as shown in (b) of FIG. 8. Meanwhile, referring to (c) of FIG. 8, in addition to an object information (OP) and an enhanced object information (EOP), the side information bitstream further includes an enhanced enhanced object information (EEOP). Since an audio signal may be decoded by using only the object information (OP) in a general object decoder, when such decoder receives a bitstream shown in (b) or (c) of FIG. 8, the enhanced object information (EOP) and/or the enhanced enhanced object information (EEOP) is discarded, and only the object information (OP) is extracted so as to be used for the decoding process.

Referring to (d) of FIG. 8, enhanced object information ($EOP_1$, . . . , $EOP_L$) are included in the bitstream. As described above, the enhanced object information (EOP) may be generated by using a variety of methods. If the first enhanced object information ($EOP_1$) and the second enhanced object information ($EOP_2$) are generated by using the first method, and of the third enhanced object information ($EOP_3$) to the fifth enhanced object information ($EOP_5$) are generated by using the second method, an identifier ($F_1$ and $F_2$) for indicating each method of generating a parameter may be included in the bitstream. As shown in (d) of FIG. 8, the identifiers ($F_1$ and $F_2$) for respectively indicating each method of generating a parameter may be inserted only once in front of each enhanced object information that is generated by using the same method as that of the parameter. However, the identifiers ($F_1$ and $F_2$) may be inserted in front of each enhanced object information.

The decoder 200 of the apparatus for processing an audio signal according to the embodiment of the present invention receives the side information bitstream and downmix, which are generated as describe above, so as to perform decoding.

Figure 9:
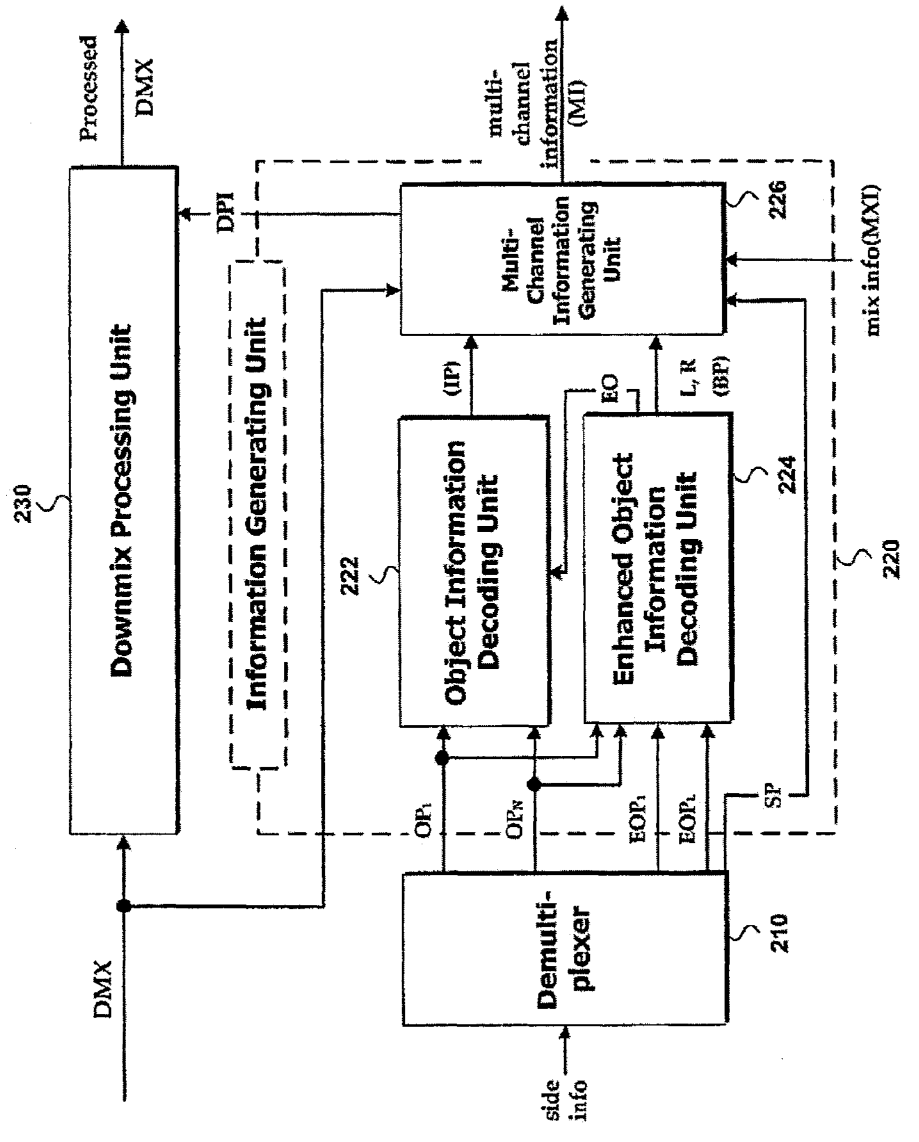
FIG. 9 illustrates a detailed block view showing a structure of a information generating unit included in the apparatus for processing an audio signal according to the embodiment of the present invention.

FIG. 9 illustrates a detailed block view showing a structure of an information generating unit included in the apparatus for processing an audio signal according to the embodiment of the present invention. The information generating unit 220 includes an object information decoding unit, and enhanced object information decoding unit 224, and a multi-channel information generating unit 226. Meanwhile, when spatial information (SP) for controlling the background object is received from the demultiplexer 210, the spatial information (SP) may be transmitted directly to the multi-channel information generating unit 226, without being used in the enhanced object information decoding unit 224 and the object information decoding unit 222.

First of all, the enhanced object information decoding unit 224 uses the object information (OP) and enhanced object information (EOP) that are received from the demultiplexer 210 in order to extract an enhanced object (EO), thereby outputting the background object (L and R). The structure of the enhanced object information decoding unit 224 will be described in detail with reference to FIG. 10.

Figure 10:
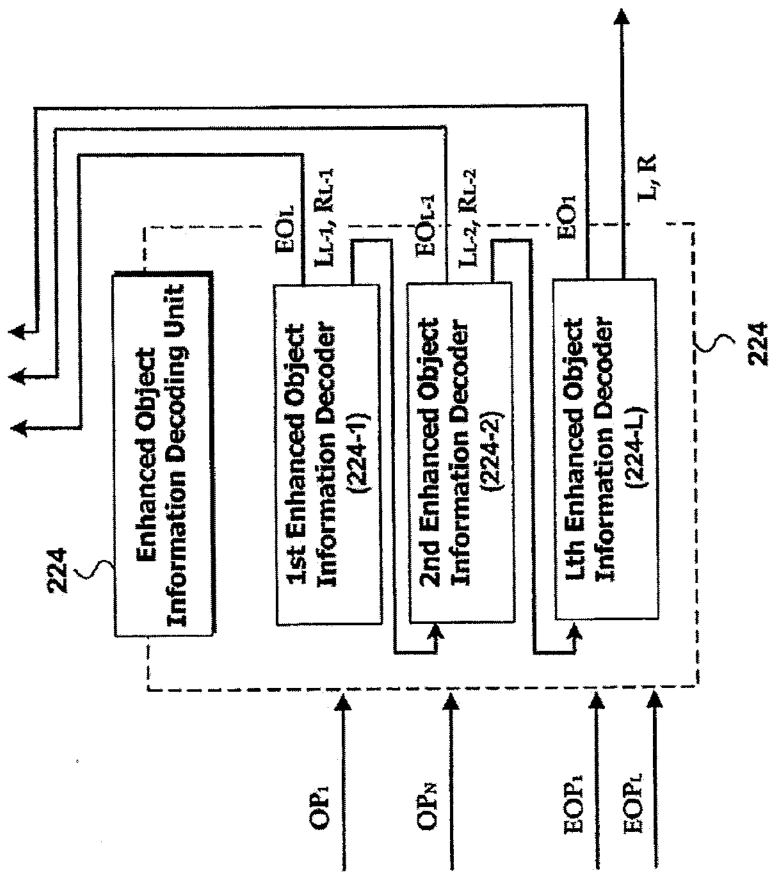
FIG. 10 illustrates an example of a detailed structure of an enhanced object information decoding unit.

Referring to FIG. 10, the enhanced object information decoding unit 224 includes a first enhanced object information decoder 224-1 to an $L^{th}$ enhanced object information decoder 224-L. Herein, the first enhanced object information decoder 224-1 uses a first enhanced object information ($EOP_L$) in order to generate a background parameter (BP) for separating a downmix (MXI) into a first enhanced object ($EO_L$) (a first independent object) and a first temporary background object ($L_{L-1}$ and $R_{L-1}$). Herein, the first enhanced object may correspond to a center channel, and the first temporary background object may correspond to a left channel and a right channel.

Similarly, the Lth enhanced object information decoder 224-L uses an Lth enhanced object information (EON in order to generate a background parameter (BP) for separating an $(L-1)^{th}$ temporary background object (L and R) into an $L^{th}$ enhanced object ($EO_1$) and a background object (L and R).

Meanwhile, the first enhanced object information decoder 224-1 to the $L^{th}$ enhanced object information decoder 224-L may be represented by a module generating (N+1) number of outputs by using N number of inputs (e.g., generating 3 outputs by using 2 inputs).

Meanwhile, in order to generate the above-described background parameter (BP), the enhanced object information decoding unit 224 may not only use the enhanced object information (EOP) but also use the object information (OP). Hereinafter, the objects of using the object information (OP) and the associated advantages will now be described in detail.

One of the objects of the present invention is to discard (or remove) an enhanced object (EO) from a downmix (DMX). Herein, depending upon a method of encoding the downmix and a method of encoding the enhanced object information, a quantizing noise may be included in the corresponding output. In this case, since the quantizing noise is associated with an original signal, more specifically, by using the object information (OP), which corresponds to information on an object prior to being grouped into an enhanced object, the sound quality may be additionally enhanced. For example, when the first object corresponds to a vocal object, the first object information ($OP_1$) includes information associated with the time, frequency, and space of the vocal sound. An output having a vocal sound subtracted from the downmix (DMX) corresponds to the equation shown below. Herein, when the first object information (ON is used on the output having the vocal sound removed therefrom so as to suppress the vocal sound, this output performs additional suppression on the quantizing noise that remains within the section where the vocal sound was initially present.

$$\text{Output}=DMX-EO_1' \quad \text{[Equation 2]}$$

(Herein, DMX indicates an input downmix signal, and $EO_1'$ represents an encoded/decoded first enhanced object within a codec.)

Therefore, by applying an enhanced object information (EOP) and an object information (OP) with respect to a specific object, the performance of the present invention may be additionally enhanced, and the application of such enhanced object information (EOP) and object information (OP) may either be sequential or be simultaneous. Meanwhile, the object information (OP) may correspond to information on an enhanced object (independent object) and background object.

Referring back to FIG. 9, the object information decoding unit 222 decodes the object information (OP) received from the demultiplexer 210 and an object information (OP) on the enhanced object (EO) received from the enhanced object information decoding unit 224. The detailed structure of the object information decoding unit 222 will be described with reference to FIG. 11.

Figure 11:
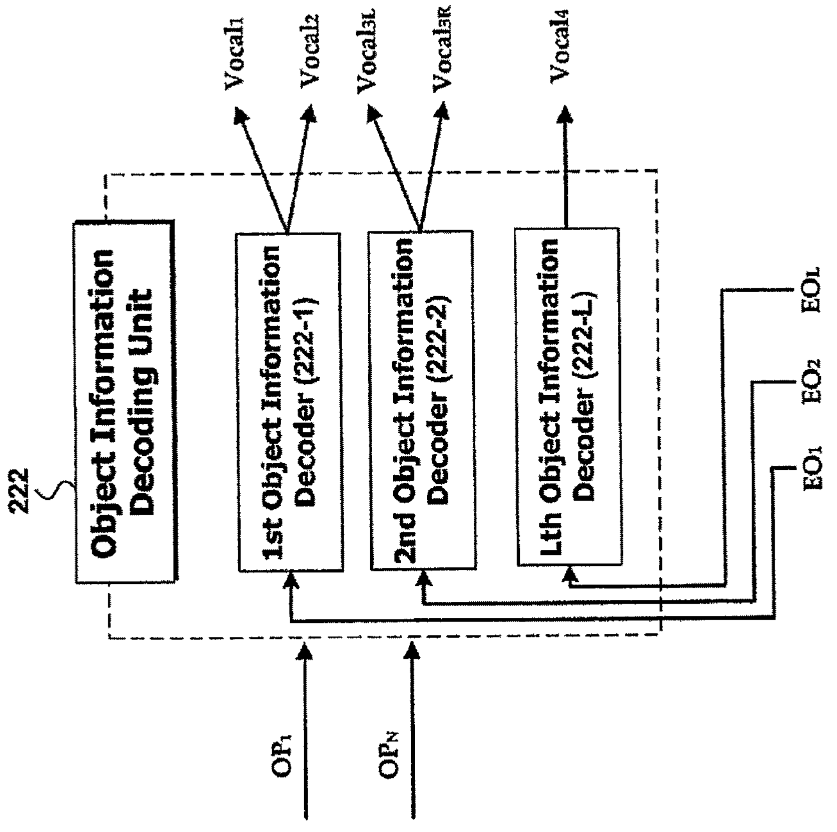
FIG. 11 illustrates an example of a detailed structure of an object information decoding unit.

Referring to FIG. 11, the object information decoding unit 222 includes a first object information decoder 222-1 to an $L^{th}$ object information decoder 222-L. The first object information decoder 222-1 uses at least one object information ($OP_N$) in order to generate an independent parameter (IP) that can separate a first enhanced object ($EO_1$) into one or more objects (e.g., $Vocal_1$ and $Vocal_2$). Similarly, the $L^{th}$ object information decoder 222-L uses at least one object information ($OP_N$) in order to generate an independent parameter (IP) that can separate an $L^{th}$ enhanced object ($EO_L$) into one or more objects (e.g., $Vocal_4$). As described above, each object that was grouped into an enhanced object (EO) may be individually controlled by using the object information (OP).

Referring back to FIG. 9, the multi-channel information generating unit 226 receives a mix information (MXI) through a user interface and receives a downmix (DMX) on a digital medium, a broadcasting medium, and so on. Then, by using the received mix information (MXI) and downmix (DMX), a multi-channel information (MI) for rendering the background object (L and R) and/or the enhanced object (EU) is generated.

Herein, a mix information (MXI) corresponds to information generated based upon an object position information, an object gain information, a playback configuration information, and so on. Herein, the object position information refers to information inputted by the user in order to control the position or panning of each object. The object gain information refers to information inputted by the user in order to control the gain of each object. The playback configuration information refers to information including a number of speakers, positions of the speakers, ambient information (virtual positions of the speakers), and so on. Herein, the playback configuration information may be received from the user, may be pre-stored within the system, or may be received from another apparatus (or device).

In order to generate the multi-channel information (MI), the multi-channel information generating unit 226 may use the independent parameter (IP) received from the object information decoding unit 222 and/or the background parameter (BP) received from the enhanced object information decoding unit 224. First of all, a first multi-channel information ($MI_1$) for controlling the enhanced object (independent object) is generated in accordance with the mix information (MXI). For example, if the user inputted control information in order to completely suppress the enhanced object, such as a vocal signal, a first multi-channel information for controlling the enhanced object from the downmix (DMX) is generated in accordance with the mix information (MXI) having the above-mentioned control information applied thereto.

After generating the first multi-channel information ($MI_1$) for controlling the independent object, as described above, a second multi-channel information ($MI_2$) for controlling the background object is generated by using the first multi-channel information ($MI_1$) and the spatial parameter (SP) transmitted from the demultiplexer 210. More specifically, as shown in the following equation, the second multi-channel information ($MI_2$) may be generated by subtracting a signal (i.e., enhanced object (EO)) to which the first multi-channel information ($MI_1$) is applied from the downmix (DMX).

$$BO=DMX-EO_L \quad \text{[Equation 3]}$$

(Herein, BO represents a background object signal, DMX signifies a downmix signal, and $EO_L$ represents an $L^{th}$ enhanced object.)

Herein, the process of subtracting an enhanced object from a downmix may be performed either on a time domain or on a frequency domain. Furthermore, the process of subtracting the enhanced object may be performed with respect to each channel, when a number of channels of the downmix (DMX) and a number of channels of the signal to which the first multi-channel information is applied (i.e., a number of enhanced objects) are equal to one another.

Then, a multi-channel information (MI) including a first multi-channel information ($MI_1$) and a second multi-channel information ($MI_2$) is generated and transmitted to the multi-channel decoder 240.

The multi-channel decoder 240 receives the processed downmix and, then, uses the multi-channel information (MI) to upmix the processed downmix signal, thereby generating a multi-channel signal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be applied in encoding and decoding an audio signal.

What is claimed is:

1. A method for decoding an audio signal, comprising:

receiving a downmix signal having at least one independent object and a background object downmixed therein;

receiving object information and enhanced object information, wherein the object information includes at least one of level information and correlation information between the independent object and the background object, wherein the enhanced object information includes a residual signal;

extracting the at least one independent object and the background object from the downmix signal using the object information and the enhanced object information;

receiving object gain information and object position information from a user, wherein the object gain information is usable to control gain of the independent object or the background object and the object position information is usable to control a position of the independent object or the background object;

generating mix information using the object gain information and the object position information;

generating downmix processing information using at least one of the object information and enhanced object information;

generating a processed downmix signal by processing at least one independent object and the background object using at least one of the downmix processing information and the mix information;

generating multi-channel information using the object information and the mix information, wherein the multi-channel information is usable to upmix the processed downmix signal; and generating a multi-channel signal using the multi-channel information and the processed downmix signal, wherein the enhanced object information is generated during a process of grouping at least one object-based signal into an enhanced object.

2. The method of claim 1, wherein the object information corresponds to information associated with the independent object and the background object.

3. The method of claim 1, wherein the residual signal is extracted during a process of grouping at least one object-based signal into an enhanced object.

4. The method of claim 1, wherein the background object includes a left channel signal and a right channel signal.

5. The method of claim 1, wherein the downmix signal is received via an object-based signal.

6. The method of claim 1, wherein the downmix signal is received on a digital medium.

7. The method of claim 1, wherein the independent object corresponds to the object-based signal and the background object corresponds to either a signal including at least one channel-based signal or a signal in which at least one channel-based signal is downmixed.

8. A non-transitory recording medium capable of reading using a computer having a program for executing the method of claim 1 stored therein.

* * * * *